June 27, 1961 P. BERTELL 2,989,896
REAR VISION MIRROR
Filed April 17, 1956

INVENTOR.
Paul Bertell
BY
Poppe and Sommer
ATTORNEYS

__

2,989,896
REAR VISION MIRROR
Paul Bertell, Williamsville, N.Y., assignor to Standard Mirror Company, Inc., Buffalo, N.Y., a New York corporation
Filed Apr. 17, 1956, Ser. No. 578,630
1 Claim. (Cl. 88—77)

This invention relates to a rear vision mirror and more particularly to a rear vision mirror for vehicles having a plurality of selectively used reflecting surfaces, usually having different reflecting characteristics, any one of which may readily be presented in operative position. The rear vision mirror of the present invention is especially advantageous when used as a "day-night" mirror, in which one of the reflecting surfaces has high reflecting properties and another of such surfaces has appreciable light absorbing properties.

One of the principal objects of the present invention is to provide a rear vision mirror provided with a plurality of selectively used reflecting surfaces having different reflecting characteristics.

Another object is to provide a rear vision mirror of the type indicated wherein different reflecting surfaces may readily and easily be placed in operative position, and wherein such surfaces are accurately and stably retained in operative position.

Another object is to provide a rear vision mirror of attractive appearance, and in which the reflecting surfaces are protected against the wind, rain, snow, etc.

Another object is to provide a rear vision mirror of the type indicated which is of simple rugged construction and which is easily assembled and disassembled.

Other objects and advantages of the invention will be apparent from the following description and drawing, in which.

Figure 1:
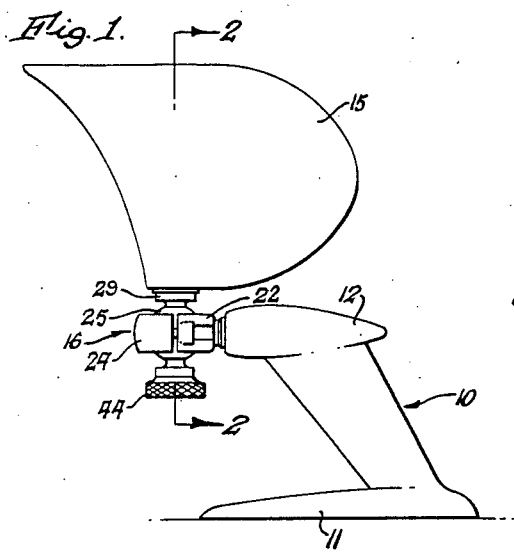
FIG. 1 is a view in plan of a rear vision mirror embodying the present invention.

In the form of invention shown, there is provided an attaching bracket 10 having a foot 11 adapted to be attached to a generally vertical surface, such as a door or window post, of a vehicle. The mirror structure proper, designated generally 14, is contained within housing or cowl 15 which is open at one side, the mirror structure and cowl being adjustably pivotally mounted by a socket member or frictional clamping device 16 on the rear end of the outer portion 12 of the attaching bracket. The mirror structure 14 embodies two oppositely directed parallel mirror panels 17 and 19 mounted on a common support. The support is such that either mirror panel may be quickly and easily placed in operative position by the operator of the vehicle, so as to face rearwardly of the vehicle, the other mirror panel, 19 in FIG. 3, then being in inoperative position, facing forwardly into the closed forward end of housing or hood 15.

Figure 4:
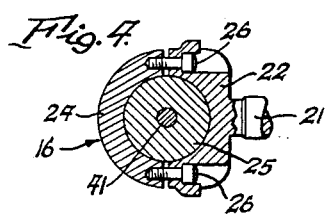
FIG. 4 is a section taken on line 4—4, FIG. 3.
Figure 5:
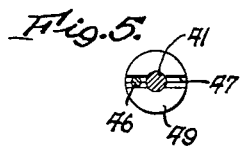
FIG. 5 is a section taken on line 5—5, FIG. 3.

Proceeding now to a detailed description of the structure of the rear vision mirror shown, the rear end of outer portion 12 of bracket 10 has a blind bore 20 therein, in which is received a shank 21 of part 22 of the socket member 16. Part 22, and the other confronting part 24 of the clamping device, provide between them a partial ball seat receiving the partial ball member 25 which provides support for the mirror structure 14 and its hood 15. Parts 22 and 24 of the clamping device are held together by studs 26 projecting through openings at the sides of part 22 and having threaded engagement with bores in part 24, as shown in FIG. 4. Studs 26 are preferably tightened to such degree that the ball member 25, and thus the mirror structure and hood, are stably held in adjusted position. The mirror structure and hood are retained in a desired position in a vertical plane by set screw 27 which has threaded engagement with an opening through the wall of bore 20 in bracket 10, the inner end of the set screw engaging shank 21 of the clamping device.

Figure 2:
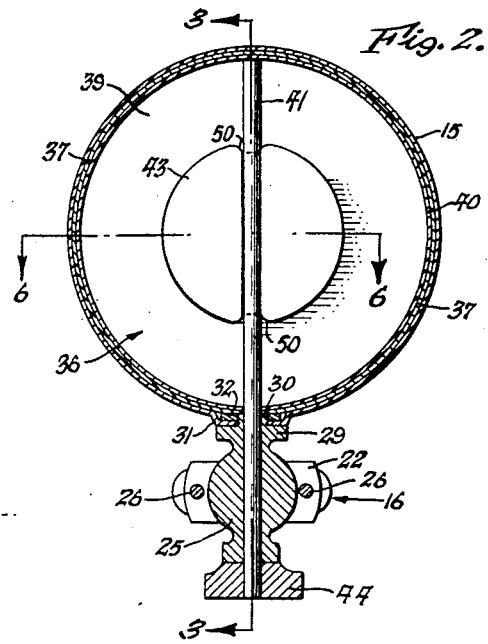
FIG. 2 is an enlarged view, generally in vertical section, through the mirror, the section being taken generally on line 2—2 of FIGS. 1 and 3, the horizontal, mirror-supporting rod being shown in elevation.
Figure 3:
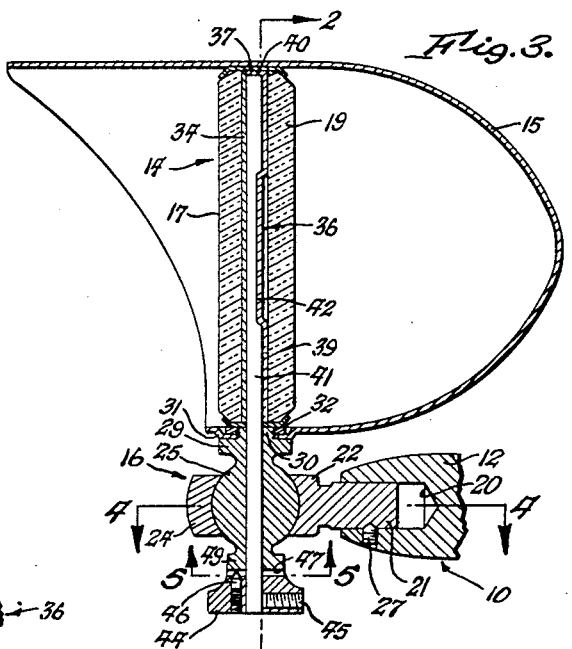
FIG. 3 is a section taken on line 3—3, FIG. 2, the mirror-supporting rod being shown in elevation.

The outer end of member 25 is provided with a flange 29 and a short externally threaded axially extending portion 30 of reduced diameter. Portion 30 projects through a hole in outwardly dished portion 31 of cowl 15, the cowl being clamped by member 25 by nut 32 lying within the dished portion 31 of the cowl and threaded onto portion 30. Preferably the inner surface of nut 32 lies flush with the adjacent inner undished surface of the cowl, as shown in FIGS. 2 and 3.

The oppositely facing mirror panels 17 and 19 are preferably made of glass. The panels are shown as circular, and of such diameter as at least substantially to span the rear, circular cylindrical portion of cowl 15. It will be understood, however, that the mirrors could be of any shape. One of the mirror panels, namely, the panel 17 is highly reflective and for this purpose is made of clear glass and provided with a reflective silver coating on its back face. The other panel 19 has a low degree of reflectivity and while this could be accomplished by a coating having a lower degree of reflectivity than silver, such as lead sulfide, it is preferred to reduce the reflectivity to around 4% of the light received by the mirror panel and for this purpose, it has been found that a surface reflection from a polished opaque glass panel has been found satisfactory, particularly in providing a true color low intensity reflection without secondary or ghost images as is apt to occur where back reflective coatings on transparent glass panels are employed. Accordingly, it is preferred that the panel 19 be composed of opaque dark glass, preferably black, to provide the desired low intensity reflection. The transparent glass panel 17 with a backing plate or disk 34 and the black glass panel 19 are held against a central circular mirror panel supporting and indexing structure 36 by a double bezel ring 37 which extends about the edges of the composite panels and the edge of structure 36 between such panels. The outer surface of the bezel ring closely confronts the inner surface of cowl 15 when the mirror structure is disposed as in FIG. 3.

Figure 6:
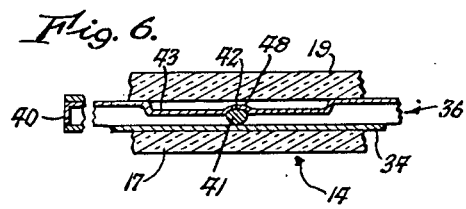
FIG. 6 is a fragmentary section through the mirrors and their support taken on line 6—6, FIG. 2.

Structure 36 is formed of a sheet metal disk, and has a circular body 39 having a flange 40 on its outer edge. Such flange extends to the left as the device is shown in FIG. 3, and abuts the backing plate or disk 34 of the panel 17, as shown in FIGS. 2 and 6, so as to form with such plate a hollow box-like structure. Such box-like structure, which forms a strong rigid support for the mirror panels 17 and 19, is supported in cowl 15 so as to be rotatable about a horizontal axis, whereby the positions of mirror panels 17 and 19 may be reversed, when desired.

A rod 41 has one end thereof rotatably mounted in a central bore through member 25 of the mirror mount. The outer end of rod 41 extends diametrically of the mirror structure 14 and is snugly received therewithin between the plate or disk 34 and radially outer portions of body plate 39 of structure 36. To provide nonrotatable engagement between structure 36 and rod 41, an extended intermediate portion 42 of rod 41 within structure 36 is recessed and flatted off, as shown in FIGS. 3 and 6, and the central part 43 of body 39 of structure 36 is dished (to the left in FIG. 3) so that the horizontal diametral portion thereof matingly fits within such recessed zone 42 of the rod. The supporting structure 36 and the mirror panels held thereby may thus be rotated about their horizontal diameters by rotating rod 41. This is conveniently accomplished by a knob 44, mounted on the end of rod 41 inwardly of partial ball member 25, and retained thereon by set screw 45 which prevents rotation of the knob relative to the rod. Knob 44 lies close to a side of the vehicle, so that the mirror panels may easily be changed by an occupant of the vehicle while the latter is in motion.

The supporting structure 36 is stably held from accidental rotation out of the position thereof shown in FIG. 3, or one displaced 180° therefrom, by a spring pressed detent 46 mounted in knob 44 so as to lie parallel to the axis thereof. The conical nose of detent 46 rides on the end surface of flange 49 on member 25 as knob 44 is turned, but snaps into diametrically disposed slot 47 on such end surface when the knob is turned to bring the detent over the slot. As shown, when detent 46 lies in the slot, one of the mirror panels lies in an operative position. Detent 46 and slot 47 releasably hold the mirror panel in such operative position, sufficient torque on knob 44, however, causing the detent to ride up out of slot 47 so that structure 36 can be turned to present the other mirror panel in operative position.

The rear view mirror shown is designed for use as a day-night mirror. For such use, the highly reflective mirror panel 17 is designed for day use to provide a clear reflection from the rear of the car during daytime. The other low reflectivity mirror panel 19 is designed for night use and is made to have highly reflective properties so as to reflect a reduced amount of light from headlights of following automobiles.

The mirror panel supporting structure 36 with its attached mirror panels may be removed from the cowl 15 by pulling the rod 41 endwise out of such structure. The central part of dished portion 43 of body 39 bends sufficiently away from rod 41 to allow the outer, unrecessed end of the rod to ride up and along portion 43 to be withdrawn axially. Such removal of rod 41 does not permanently deform plate 39, however, so that upon assembly of the device the rod 41 may be thrust into structure 36, when the latter is held in the correct position in cowl 15, the outer end of the rod deflecting portion 43 as described. When the rod has been fully inserted, the dished portion 43 of plate 39 again snaps into the recess in the rod, thereby holding the rod against accidental withdrawal and the mirror panel supporting structure against rotation with respect to the rod. To aid the described insertion and withdrawal of rod 41, the horizontal diametrical zone of dished portion 43 may be provided with a shallow channel 48 the inner surface of which engages the recessed portion of the rod. Partial funnel-shaped or flared formations 50 pressed into portion 43 at the ends of channel 48 also aid in such operations.

In the embodiment shown, the mirror structure 14 is rotatable supported at one edge only by rod 41. The mirror structure is stably held centered in the cowl in either of its two operative positions by reason of the more or less snug engagement between the outer surface of the bezel ring 37 and the inner surface of the circular cylindrical side wall of cowl 15.

It will accordingly be seen that the present invention provides an economical rear vision mirror of attractive appearance which allows the selective use of a plurality of mirror panels, the shifting of the desired panel into operative position being effected quickly and easily by an occupant, such as the driver, of the vehicle to which the rear vision mirror is attached. Because the two mirror panels are positioned symmetrically of rod 41 and their reflecting surfaces are located at the same distance from the axis of rotation of structure 36, no adjustment of the mirror device as a whole is necessary when structure 36 is turned from one operative position to the other.

I claim:

A rear vision mirror assembly, comprising a cowl open at one side, a ball member fast to the exterior of said cowl at the open side thereof, a socket member frictionally supporting said ball member, a rod journalled in said ball member and having one end projecting into said cowl and its other end projecting outwardly from said ball member, a pair of mirror panels arranged back to back and fixed to opposite sides of said one end of said rod within said cowl and having reflective faces of different value, and means connected with said other end of said rod for turning said mirror panel to expose one or the other of said reflective faces, whereby said ball member is frictionally journalled to permit of aiming the cowl and contained mirror panels vertically and horizontally and also journals said adjusting rod to permit of exposing one or the other of said reflective faces.

References Cited in the file of this patent

UNITED STATES PATENTS

| | | |
|---|---|---|
| 1,410,186 | Jassen | Mar. 21, 1922 |
| 1,887,706 | Bettman | Nov. 15, 1932 |
| 1,964,626 | Fotakis | June 26, 1934 |
| 2,307,532 | Murphy | Jan. 5, 1943 |
| 2,706,931 | Morgenstern | Apr. 26, 1955 |
| 2,737,852 | Porter et al. | Mar. 13, 1956 |

FOREIGN PATENTS

| | | |
|---|---|---|
| 164,038 | Australia | Feb. 10, 1955 |
| 298,357 | Great Britain | Oct. 11, 1928 |
| 915,538 | Germany | July 22, 1954 |
| 374,845 | France | July 19, 1907 |
| 705,096 | France | Mar. 2, 1931 |